United States Patent [19]

Komurasaki et al.

[11] Patent Number: 5,226,325
[45] Date of Patent: Jul. 13, 1993

[54] ACCELERATION DETECTOR WITH RADIAL ARM DIAPHRAGM

[75] Inventors: Satoshi Komurasaki; Fumito Uemura; Masanori Yamano, all of Himeji, Japan

[73] Assignee: Mitsubishi Denki Kabushiki Kaisha, Tokyo, Japan

[21] Appl. No.: 692,344

[22] Filed: Apr. 26, 1991

[30] Foreign Application Priority Data

Apr. 27, 1990 [JP] Japan .................. 2-113646
May 15, 1990 [JP] Japan .................. 2-122995
Jun. 8, 1990 [JP] Japan .................. 2-60161[U]

[51] Int. Cl.⁵ .................................. G01P 15/09
[52] U.S. Cl. ............................ 73/517 R; 73/35; 310/324
[58] Field of Search .............. 73/35, 654, 517 R; 310/329, 324

[56] References Cited

U.S. PATENT DOCUMENTS

| | | | |
|---|---|---|---|
| 4,190,782 | 2/1980 | Guess | 910/324 |
| 4,193,647 | 3/1980 | Guess et al. | 73/35 |
| 4,337,640 | 7/1982 | Muranaka et al. | 73/35 |
| 4,382,377 | 5/1983 | Kleinschmidt et al. | 73/35 |
| 4,414,840 | 11/1983 | Yamaguchi et al. | 73/35 |
| 4,630,465 | 12/1986 | Hatton | 73/35 |

FOREIGN PATENT DOCUMENTS 3817354 12/1988 Fed. Rep. of Germany .
0294920 12/1987 Japan ........................ 73/654

*Primary Examiner*—John E. Chapman
*Attorney, Agent, or Firm*—Sughrue, Mion, Zinn, Macpeak and Seas

[57] ABSTRACT

An acceleration detector comprising a housing adapted to be rigidly secured to an object of which acceleration is to be detected and a transducer assembly disposed within the housing for detecting the acceleration on the housing. The transducer assembly comprises a disc-shaped diaphragm having a circular central region flexible in response to the acceleration on the housing and a plurality of radial arms integrally extending at equal intervals from the central region and supported by the housing at outer ends. A disc-shaped piezoelectric element is attached to the central region of the diaphragm for sensing flexture of the central region and generating a signal representative of the acceleration on the housing. The central region has a diameter not smaller than that of the piezoelectric element. The radial arms may have a total circumferential width dimension effective to improve temperature vs. resonance frequency characteristics of the transducer assembly. The housing may comprise a base and a cover securely connected together, and a continuous ring-shaped member connected to outer ends of the radial arms is firmly clamped in an air-tight manner between the base and the cover.

10 Claims, 5 Drawing Sheets

ACCELERATION DETECTOR WITH RADIAL ARM DIAPHRAGM

BACKGROUND OF THE INVENTION

This invention relates to an acceleration detector and, more particularly, to an acceleration detector for detecting knocking of an internal combustion engine.

A conventional acceleration detector for detecting knocking of an internal combustion engine comprises a housing adapted to be rigidly secured to an engine and an acceleration transducer assembly disposed within the housing for detecting the acceleration on the housing which represents knocking of the engine. The housing comprises a base and a cover securely connected together. The transducer assembly comprises a disc diaphragm and a piezoelectric element attached to the center of the diaphragm for sensing flexure thereof for generating a signal representative of the acceleration of the housing. The diaphragm is rigidly supported by the housing at its outer continuous circumferences edge portion. Typically, the circumference edge portion is firmly clamped between edges of the base and the cover of the housing which are mechanically connected together by means of caulking.

The sensitivity of the acceleration transducer assembly comprising the diaphragm and the piezoelectric element is at its best at the resonance frequency $f_0$ which is determined by the diameter and the thickness of the diaphragm and the piezoelectric element, whereupon the output from the transducer assembly is at its maximum. The resonance frequency $f_0$ is an important characteristic of the acceleration detector and it is required that the deviation of the resonance frequency $f_0$ from one detector to another is minimized.

Another important factor affecting the resonance frequency $f_0$ is temperature as illustrated in the graph of FIG. 5. Since the temperature characteristics of the acceleration detector determine changes in the resonance frequency $f_0$ due to the temperature change, and this change in the resonance frequency $f_0$ affects the system performance, it is desirable to reduce the amount of the above change.

With the conventional acceleration detector as described above, the disc-shaped diaphragm is rididly supported by the housing at its entire circumferential edge, so that the temperature characteristics of the resonance frequency are poor and it is desired to improve the temperature characteristics of the resonance frequency of the acceleration detector.

SUMMARY OF THE INVENTION

Accordingly, one object of the present invention is to provide an acceleration detector free from the above discussed problems of the conventional acceleration detector.

Another object of the present invention is to provide an acceleration detector having good temperature characteristics of the resonance frequency.

Another object of the present invention is to provide a method for controlling the resonance frequency of an acceleration transducer assembly.

With the above objects in view, the acceleration detector comprises a housing adapted to be rigidly secured to an object whose accleration is to be detected, such as an internal combustion engine, and a transducer assembly disposed within the housing for detecting the acceleration of the housing. The transducer assembly comprises a substantially disc-shaped diaphragm having a substantially circular central region flexible in response to the acceleration on the housing and a plurality of flexible radial arms each having an inner end connected to the central region and an outer end connected to the housing. A substantially disc-shaped piezoelectric element is attached to the central region of the diaphragm for sensing flexure of the central region and generating a signal representative of the acceleration of the housing.

The central region and the radial arms of the diaphragm may be integral portions of the diaphragm, and the radial arms supporting the central region have a total circumferential width dimension effective to improve temperature characteristics vs. resonance frequency of the transducer assembly. The central region may have a diameter that can be adjusted by machining to provide a desired resonance frequency of the transducer assembly. Alternatively, the housing comprises a base and a cover securely connected to the base, and a continuous ring-shaped member integrally connected to outer ends of the radial arms is firmly clamped between the base and the cover to establish an air-tight relationship therebetween.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENTS

Figure 1:
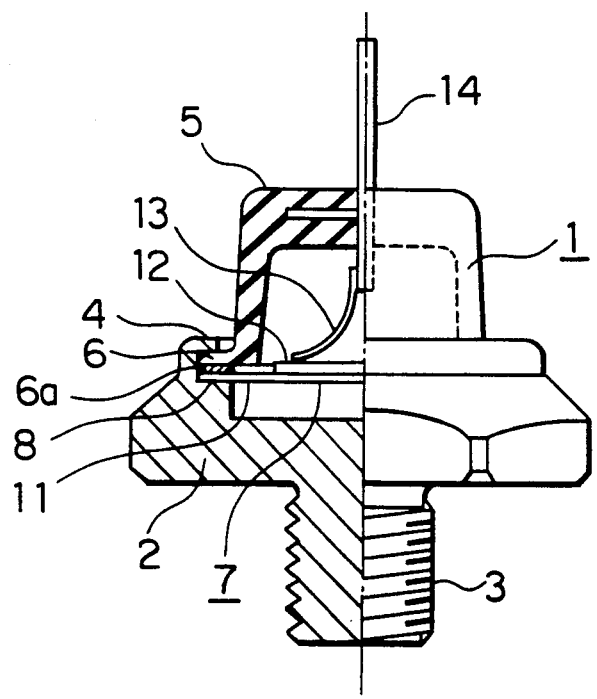
FIG. 1 is a partial sectional view of an acceleration detector of the present invention.

FIG. 1 illustrates an acceleration detector constructed in accordance with the present invention, which comprises a housing 1 having a metallic base 2 with a screw 3 and a flange 4, and a plastic cap 5 with a flange 6. The base 2 is adapted to be rigidly secured by the screw 3 to an object whose acceleration is to be detected, such as an internal combustion engine (not shown). The acceleration detector also comprises an acceleration transducer assembly 7 disposed within the housing 1 for detecting the acceleration on the internal combustion engine (not shown) and therefore the housing 1. The transducer assembly 7 is placed on an annular planar surface defined by a step 8 on the base 2 inside of the flange 4. The cap 5 is firmly attached to the base 2 by caulking the flange 4 of the base 2 over the flange 6 of the cap 5 with the edge portion of the transducer assembly 7 firmly sandwiched between the cap flange 6 through a spring washer 6a and the step 8 of the base 2.

The transducer assembly 7 comprises a substantially disc-shaped metallic diaphragm 11 and a substantially disc-shaped piezoelectric element 12 attached to the diaphragm 11 for sensing the flexure of the diaphragm 11 and generating an electrical signal representative of the acceleration of the housing 1 attached to the engine (not shown). The signal from the piezoelectric element 12 is supplied through a lead 13 connected to the piezoelectric element 12 and an output terminal 14 insert-molded into the plastic cap 5.

Figure 2:
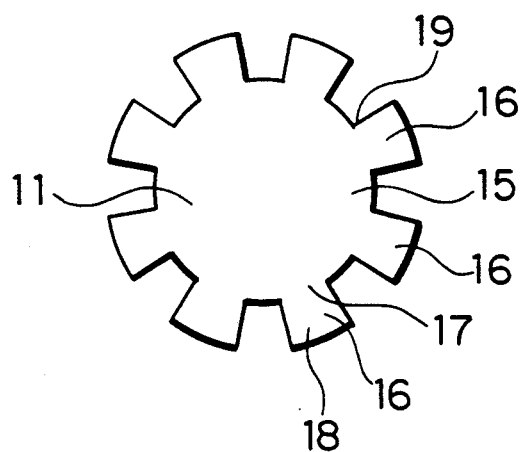
FIG. 2 is a plan view illustrating the diaphragm of the acceleration detector of the present invention illustrated in FIG. 1.
Figure 3:
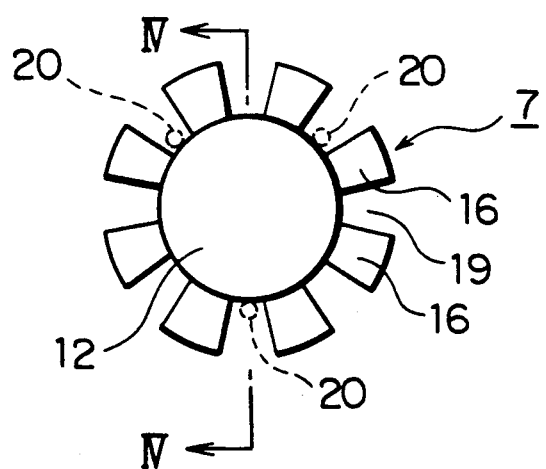
FIG. 3 is a plan view illustrating one example of positioning of the piezoelectric element on the diaphragm.
Figure 4:
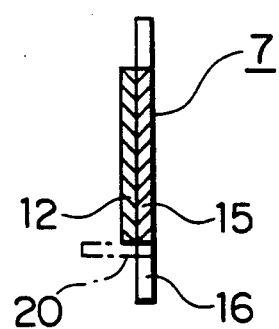
FIG. 4 is a diagramatic sectional view taken along line IV—IV of FIG. 2.

According to the present invention, as best seen from FIGS. 2 to 4, the disc-shaped diaphragm 11 comprises a substantially circular central region 15 flexible in response to the acceleration of the housing 1 and having the piezoelectric element 12 attached on the central region 15. The diaphragm 11 also comprises a plurality of flexible radial arms 16 each having an inner end 17 integrally connected to the central region 15 and an outer end 18. The radial arms 16 are separated by notches or spaces 19 and are disposed at equal circumferential intervals. As illustrated in FIG. 1, the outer ends 18 of the diaphragm 11 are rigidly connected to the housing 1 by being clamped between the cap flange 4 through the spring washer 6a and the base step 8. The central region 15 has a diameter substantially equal to the diameter of the piezoelectric element 12 as illustrated in FIGS. 3 and 4. When the diameters of the piezoelectric element 12 and the central region 15 of the diaphragm 11 are equal, the accurate concentric positioning of the element 12 on the central region 15 during bonding can be relatively easily achieved by employing positioning pins 20 (FIGS. 3 and 4) planted on a jig (not shown), whereby deviation of the resonance frequency $f_0$ of the transducer assembly 7 from one assembly to another can be minimized.

The radial arms 16 supporting the central region 15 have a total circumferential width dimension effective to improve the temperature characteristics vs. resonance frequency of the transducer assembly 7. In the preferred embodiment illustrated in FIGS. 1 to 4, the number of the radial arms 16 is eight and the total width dimension of the radial arms 16 is substantially equal to the total width dimension of the spaces 19 defined between the radial arms 16.

Since the circumferential length of the outer circumferential edge of the diaphragm 11 at which the diaphragm 11 is clamped between the base 1 and the cap 2 is only about 50% of the entire outer circumferential edge length of the diaphragm 11, the temperature characteristics vs. resonance frequency $f_0$ can be significantly improved.

Figure 5:
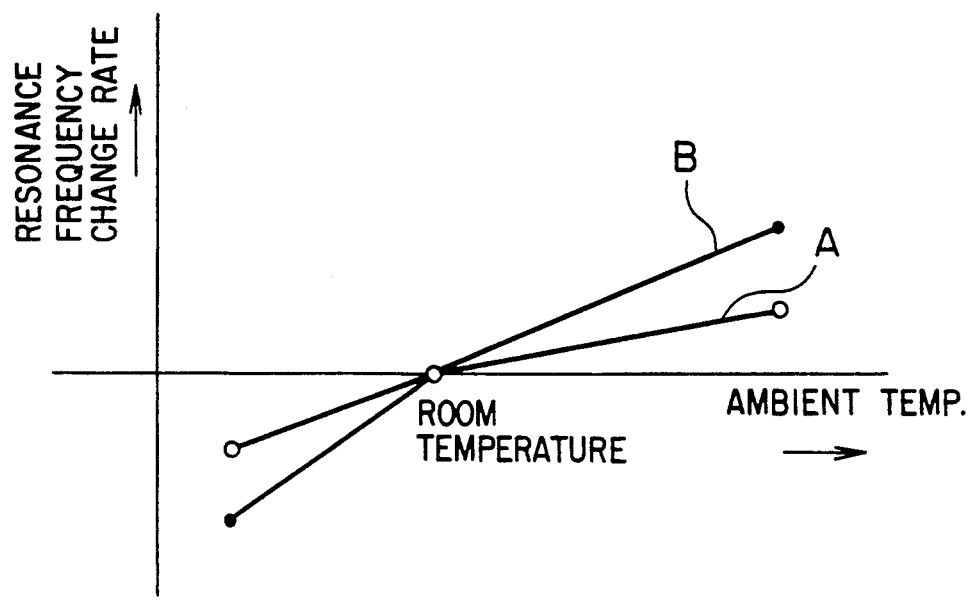
FIG. 5 is a graph illustrating how the variation rate of the resonance frequency changes in response to the temperature change.

FIG. 5 illustrates the temperature characteristics vs. resonance frequency $f_0$ of the acceleration transducer assembly 7 of the present invention (curve A) in which the diaphragm 11 is rigidly connected to the housing 1 at the outer ends 18 of the radial arms 16, in comparison with the temperature characteristics vs. resonance frequency $f_0$ of a conventional transducer assembly (curve B) in which the diaphragm is firmly connected to the housing at the entire outer circumferential edge of the diaphragm.

In the above described embodiment, the acceleration transducer assembly 7 has also a good durability against heat. Also, in order to reduce the effects of temperature change on the characteristics of the acceleration transducer assembly 7, it is important to balance the coefficients of thermal expansion of the diaphragm 11, the piezoelectric element 12 and the bonding agent therebetween. This is also important for a longer durability.

Figure 6:
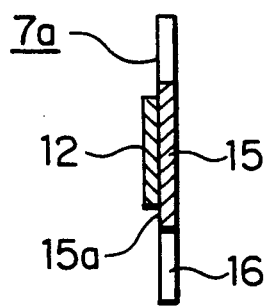
FIG. 6 is a view similar to FIG. 4 but illustrating another embodiment of the present invention.

FIG. 6 illustrates another embodiment of the acceleration transducer assembly 7a the present invention in which the disc-shaped central region 15 is larger than the piezoelectric element 12. In this arrangement, the outer peripheral portion 15a of the central region 15 outside of the piezoelectric element 12 serves to hold an excess amount of the bonding agent flown from between the piezoelectric element 12 and the diaphragm 11, so that the running of the excess bonding agent may be prevented.

Figure 7:
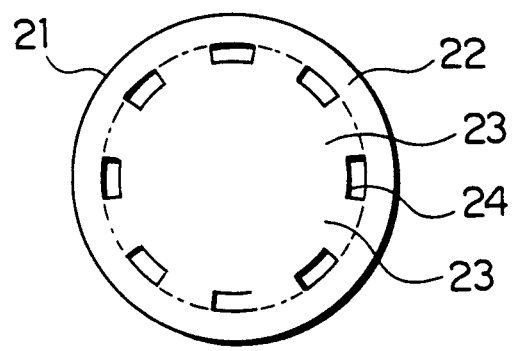
FIG. 7 is a diagramatic plan view of the acceleration transducer.

FIG. 7 illustrates still another embodiment of the present invention, in which a diaphragm 21 which can be used in place of the diaphragm 11 of the acceleration transducer assembly 7 comprises a continuous ring-shaped member 22 integrally connected to the outer end of each of the radial arms 23 separated by windows or openings 24. In the illustrated embodiment, the ring-shaped member 22 is an integral part of the diaphragm 21 formed by punching out the openings 24 defining the spaces from a metallic disc. When assembled, the continuous ring-shaped member 22 is circumferentially continuously clamped between and therefore contacted with the base 2 and the cap 5 without any discontinuity. Accordingly, a reliable hermetic seal is established completely around the circumference of the diaphragm 21.

Figure 8:
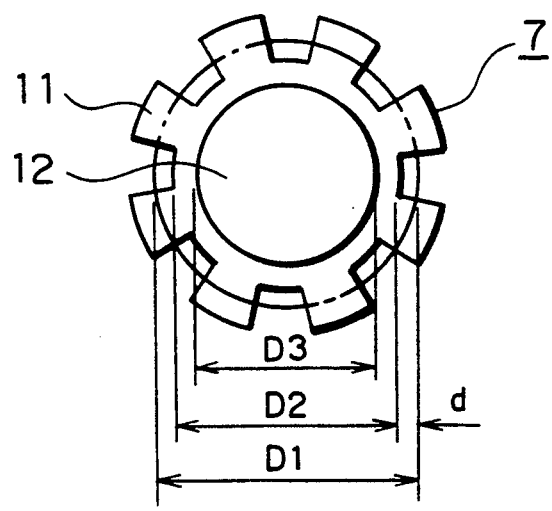
FIG. 8 is a diagramatic side view of the acceleration transducer.
Figure 9:
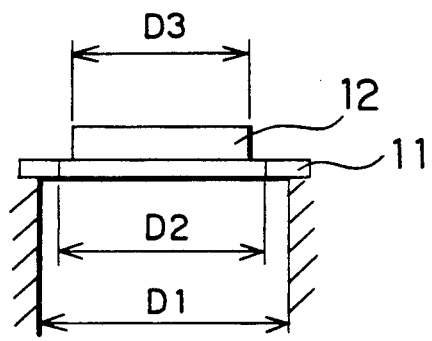
FIG. 9 is a diagramatic sectional side view of the apparatus for use in controlling the resonance frequency of the acceleration transducer.

As diagrammatically illustrated in FIGS. 8 and 9, the acceleration transducer assembly 7 illustrated in FIGS. 3 and 4 or the acceleration transducer assembly 7a illustrated in FIG. 6 has a diameter D1 of an effective area of the diaphragm 11 defined within the supporting shoulder portion of the housing 1, a diameter D2 of the central region 15 of the diaphragm 11, a diameter D3 of the piezoelectric element 12, and an effective length of the radial arms 16 or 23 or the effective radial depth d of the spaces 19. These relationships also apply to the diaphragm 21 illustrated in FIG. 7. The resonance frequency $f_0$ of the transducer assemblies of the present invention illustrated in FIGS. 3, 4, 6 and 7 is dependent upon the diameters D1, D2 (or d), D3 as well as the thicknesses of the diaphragm 11 and the piezoelectric element 12.

Accordingly, with the transducer assembly 7, 7a or the transducer assembly employing the diaphragm 21 of the present invention in which a plurality of radial arms 16 or 23 are provided, the resonance frequency $f_0$ of the transducer assembly can be easily tailored to each of various types of engines or different ranges of knocking frequencies by adjusting the diameter D2 of the central region of the diaphragm or the effective radial depth d of the openings between the radial arms. This is significant because the same type of acceleration detector but having a different resonance frequency $f_0$ can be relatively easily prepared for various engines without the need for changing the main components of the acceleration detector.

In the conventional transducer assembly which has no radial arms or spaces in the diaphragm, the diameter D2 of the central region of the diaphragm cannot be used as the factor for the adjustment of the resonance frequency $f_0$. If the diameter of the diaphragm is to be changed, the housing diameter must be changed, and if the thickness of the diaphragm is to be changed, the dimensions of the acceleration detector must often be changed, so that these measures are difficult to adopt because the price of the acceleration detector is increased. If the diameter or the thickness of the piezoelectric element is to be changed, the molding dies for the element must be changed, and if different piezoelectric elements are to be prepared, the different dies must be prepared. This is difficult to cope with and the cost of the transducer is increased. While the thickness of the piezoelectric element may be decreased by abrading it, this is an additional step and precise adjustment of the resonance frequency $f_0$ is difficult.

Figure 10:
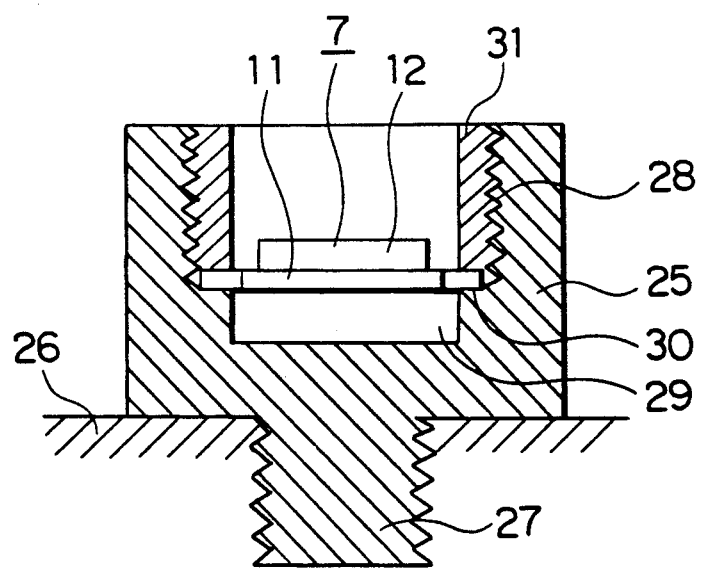
FIG. 10 is a plan view of the diaphragm of another embodiment of the present invention.

FIG. 10 illustrates a jig 25 used in the adjustment of the resonance frequency $f_0$ of the acceleration transducer assembly 7 of the present invention. The jig 25 is a substantially hollow cylindrical member secured to a vibrator 26 by a screw 27. The hollow portion of the jig 25 has a threaded inner surface 28 and a reduced-diameter portion 29 separated by a shoulder 30. The transducer assembly 7 is placed on the shoulder 30 and a threaded nut 31 is engaged with the threaded surface 28 so that the hollow nut 31 firmly holds the outer circumferential edge of the diaphragm 11 of the transducer assembly 7.

In order to adjust the resonance frequency $f_0$ of the transducer assembly 7, the transducer assembly 7 held in the jig 25 is vibrated by the vibrator 26 at a desired design frequency $f_r$ and an output signal from the piezoelectric element 12 is measured. If the resonance frequency $f_0$ is different from the design frequency $f_r$, the output signal from the piezoelectric element 3 is zero or small. In this case, the diameter D2 of the central region 15 of the diaphragm 11 is decreased by machining the outer diameter portion of the central region 15 until the output signal from the transducer assembly 7 indicates that the resonance frequency $f_0$ equals the design frequency $f_r$. This machining may be conveniently achieved by a laser beam. If it is difficult to achieve the above adjustment of the resonance frequency $f_0$ while the transducer assembly 7 is being vibrated for any reasons, such as when the signal is disturbed by the vibration of the diaphragm induced by the diameter-reducing machining, the machining should be stopped at least during the measuring of the output signal and the machining and measuring may be repeated until the resonance frequency $f_0$ equals the design frequency $f_r$.

What is claimed is:

1. An acceleration detector comprising a housing adapted to be rigidly secured to an object whose acceleration is to be detected, and a transducer assembly disposed within said housing for detecting the acceleration of said housing, said transducer assembly comprising:

a generally disc-shaped diaphragm disposed within said housing and having a generally circular, unsupported central region freely flexible in response to the acceleration of said housing, and a plurality of flexible radial arms each having an inner end connected to an outer periphery of said central region and an outer end firmly connected to said housing such that said central region vibrates in a resonant manner, via said radial arms, in response to the acceleration of said housing, said radial arms being coplanar with said central region; and a generally disc-shaped piezoelectric element attached to said central region of said diaphragm for sensing flexure of said central region and generating a signal representative of the acceleration of said housing.

2. An acceleration detector as claimed in claim 1, wherein said central region and said radial arms of said diaphragm are integral portions of said diaphragm.

3. An acceleration detector as claimed in claim 1, wherein said radial arms are disposed at equal circumferential intervals.

4. An acceleration detector as claimed in claim 1, wherein said central region has a diameter approximately equal to the diameter of said piezoelectric element.

5. An acceleration detector as claimed in claim 1, wherein said central region has a diameter larger than the diameter of said piezoelectric element.

6. An acceleration detector as claimed in claim 1, wherein a total circumferential width dimension of said radial arms is substantially equal to a total circumferential width dimension of spaces defined between said radial arms.

7. An acceleration detector as claimed in claim 1, wherein said housing comprises a base and a cover securely connected to said base, said outer ends of said radial arms being firmly clamped between said base and said cover.

8. An acceleration detector as claimed in claim 1, wherein said diaphragm comprises a generally ring-shaped member connected to said outer ends of said radial arms.

9. An acceleration detector as claimed in claim 2, wherein said diaphragm comprises a continuous ring-shaped member integrally connected to said outer ends of said radial arms.

10. An acceleration detector as claimed in claim 9, wherein said housing comprises a base and a cover securely connected to said base, and said ring-shaped member connected to outer ends of said radial arms is firmly clamped between said base and said cover in an air-tight manner.

* * * * *